US006494152B2

(12) United States Patent
Gatley, Jr.

(10) Patent No.: US 6,494,152 B2
(45) **Date of Patent: *Dec. 17, 2002**

(54) STAMPED BLOWER HOUSING WITH 4" TRANSITION

(75) Inventor: William Stuart Gatley, Jr., Cassville, MO (US)

(73) Assignee: Jakel Incorporated, Highland, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/730,122

(22) Filed: Dec. 5, 2000

(65) Prior Publication Data

US 2002/0025252 A1 Feb. 28, 2002

Related U.S. Application Data

(63) Continuation-in-part of application No. 09/651,645, filed on Aug. 30, 2000, now Pat. No. 6,314,894.

(51) Int. Cl.[7] .......................... F03D 11/00; F04D 29/42

(52) U.S. Cl. ...................... 110/341; 110/162; 415/204; 415/206; 415/207; 415/212.1

(58) Field of Search ............................ 415/212.1, 203, 415/204, 206, 207, 182.1, 224; 110/205, 206, 214, 297, 147, 162, 341

(56) References Cited

U.S. PATENT DOCUMENTS

| | | | | |
|---|---|---|---|---|
| 87,625 A | | 3/1869 | Bookwalter | |
| 2,596,646 A | * | 5/1952 | Buchi | 415/204 |
| 3,301,472 A | * | 1/1967 | Dixon et al. | 415/204 |
| 4,199,302 A | * | 4/1980 | Goettl | 384/417 |
| 4,247,250 A | | 1/1981 | Lipe et al. | |
| D263,839 S | | 4/1982 | Somme | |
| 4,656,710 A | * | 4/1987 | Maciejewski | 29/888.02 |
| 5,040,943 A | | 8/1991 | Dwyer et al. | |
| 5,112,190 A | | 5/1992 | Kajiwara et al. | |
| 5,133,642 A | | 7/1992 | Kajiwara | |
| 5,310,310 A | | 5/1994 | Nakatsukasa et al. | |
| 5,358,380 A | | 10/1994 | Arakawa | |
| 5,375,586 A | * | 12/1994 | Schumacher et al. | 126/110 R |
| 5,414,999 A | | 5/1995 | Barnes | |
| 5,536,140 A | * | 7/1996 | Wagner et al. | 415/119 |
| 5,820,458 A | | 10/1998 | Lai | |
| 5,864,190 A | | 1/1999 | Bacchiocchi | |
| 5,951,245 A | | 9/1999 | Sullivan | |
| 5,997,246 A | | 12/1999 | Humbad | |
| 6,155,781 A | | 12/2000 | Tsai | |
| 6,171,054 B1 | * | 1/2001 | Mann et al. | 415/119 |

* cited by examiner

*Primary Examiner*—Edward K. Look
*Assistant Examiner*—Richard A. Edgar
(74) *Attorney, Agent, or Firm*—Thompson Coburn LLP

(57) ABSTRACT

A blower for a furnace is provided where the blower has a housing with an industry standard 4" diameter exhaust port. The discharge of the blower housing is coupled directly to exhaust piping without the use of transition pieces or expender pieces.

21 Claims, 3 Drawing Sheets

STAMPED BLOWER HOUSING WITH 4" TRANSITION

RELATED APPLICATION DATA

This application is a continuation-in-part of application Ser. No. 09/651,645, filed Aug. 30, 2000, entitled "Furnace Blower Housing with Integrally Formed Exhaust Transition", now U.S. Pat. No. 6,314,894, issued Nov. 13, 2001.

BACKGROUND OF THE INVENTION (i) Field of the Invention

The present invention relates to a blower for a furnace that is used to remove combustion products and exhaust gases from the furnace. Specifically, the invention pertains to the construction of a housing for the blower where the housing has a 4" diameter discharge that couples directly to industry standard 4" exhaust piping.

(ii) Description of the Related Art

Furnaces utilize a blower to induce a draft through the furnace to draw combustion air into a combustion chamber of the furnace where the combustion air is mixed with fuel and ignited to produce heat for the furnace. The combustion products are drawn through a heat exchanger where the heat from the combustion products is transferred to temperature controlled circulating air which is directed through the house. The combustion products exit the heat exchanger and enter the furnace blower where they are propelled from the furnace blower into exhaust piping that leads to the outside atmosphere.

The blower housings that have been used to construct these furnace blowers have been conventionally made of sheet metal. The sheet metal is stamped to form the housing with a generally flat top wall and depended side wall that extends around a peripheral edge of the top wall. The top wall and side wall generally define a hollow interior for the blower housing. Typically, a motor is mounted on the top wall and a motor shaft is directed through a shaft hole in the top wall into the hollow interior of the blower housing. The motor shaft is coupled to an impeller, and the rotation of the impeller moves the combustion products and exhaust gases through the furnace. Generally, the impeller compresses the gases against the side wall of the blower housing where the exhaust gases are pressurized and directed toward a discharge formed in the blower housing. The discharge is then coupled to the exhaust pipe so that the exhaust gases and combustion products may be propelled into the exhaust pipe to be vented to the atmosphere.

In the prior art, the discharge generally has a rectangular cross-section and the exhaust piping has a generally circular cross-section. Moreover, exhaust piping in residential housing has an industry standard 4" diameter. Thus, in order to couple the discharge to the exhaust, conventional blowers utilize a transition piece. The transition piece is attached to the blower housing and converts the rectangular discharge into a circular exhaust port that can be connected to the circular exhaust pipe. Moreover, this transition piece expands the discharge of the exhaust port into the industry standard 4" exhaust piping connection.

These transition pieces are typically made of cast aluminum and are expensive to manufacture. The transition piece increases the cost of the blower and the associate furnace with which the blower is assembled. In the prior art, the exhaust transition pieces are often attached to the rectangular blower housing exhaust port by screws. Usually, 3 or 4 sheet metal screws are used to attach the exhaust transition piece to the discharge of the blower housing. A manual operation is required to attach the transition pieces to the blower housing. This increases manufacturing costs associated with production of the blower. Additionally, the screws sometimes loosen, causing the exhaust transition piece to become loosely connected to the discharge. This sometimes causes leaks and may product undesirable noise as the exhaust transition piece rattles and vibrates when the blower is operated.

In order to overcome the shortcomings of the prior art cast aluminum pieces, the inventor has succeeded in developing an exhaust transition that is considerably less expensive to manufacture and eliminates the problems with leakage and undesirable vibration. In a pending application Ser. No. 09/651,645 filed on Aug. 30, 2000, entitled "Furnace Blower Housing With Integrally Formed Exhaust Transition," (incorporated herein by reference) a two-piece exhaust transition is described. In this arrangement, the exhaust transition has a first section which is integrally formed with the blower housing body and a second section which attaches to the first section to form the exhaust port of the discharge in a circular configuration that can be easily coupled to the exhaust pipe. The first and second sections may be joined together by crimping or other mechanical fastening methods so as to produce a seamless exhaust transition from the blower housing to the exhaust pipe.

Generally speaking, furnace manufactures specify the size and configuration of the blower and require that the blower fit in a predetermined envelope on a furnace. Thus, the blower manufacturer must design the blower to meet the size requirements while assuring the blower has sufficient air moving capacity to remove combustion products and other gases from the furnace. Typically, in most residential housing furnace constructions, the blower housing must have an axial height of no more than 2¼". This poses a problem for the blower manufacturer when forming an exhaust transition at the discharge that directly meets the industry standard 4" exhaust piping requirement. In order to reduce costs of blower housing, the housings are generally stamped from metallic stock blanks. As described previously, the blank is formed with a top wall and a depending side wall. The side wall is generally sized with an axial height of 1½" to 2". With an overall diameter constraint and the side wall dimension constraints, the maximum size exhaust transition that may be formed is approximately 3". Thus, in order to couple the exhaust transition portion of the discharge to the exhaust piping, a 3" to 4" expander piece is required. Use of the 3" to 4" expanded case is problematic as described previously in that it increases the parts associated with the furnace, increases assembly labor of attaching the blower to the exhaust piping, and increases the possibility of leakage.

In order to avoid use of the transition piece, several attempts have been made to form the blower housing discharge with an exhaust port at 4" that may be directly coupled to the exhaust pipe. However, in attempting to stamp the discharge exhaust port at 4", several manufacturing problems occur. The extreme rapid change of the axial dimension at the discharge causes failure of the blower housing by separation of the top wall from the side wall. This is also coupled with extreme distortion and insufficient thickness of the top wall in the area around the discharge. Due to size constraints, the overall discharge exhaust port cannot be extended outward from the blower housing. Thus, in order to create a more gradual increase in the axial height of the blower housing to the discharge, the transition point has been formed within the interior of the blower housing.

However, as the transition point is moved into the interior of the blower housing, overall blower performance is degraded. The rapid increase in area at the discharge of the blower leads to a decrease in the overall pressure that can be developed by the impeller in the blower housing.

Thus, what is needed is a blower housing having an integrally formed 4" transition piece which may be easily manufactured without causing failure of the blower housing and without degrading overall performance of the blower. Such a blower housing would eliminate parts and reduce assembly labor. The blower housing would directly couple to the exhaust pipe and provide a seamless transition to the exhaust pipe to reduce the possibility of leakage.

SUMMARY OF THE INVENTION

The present invention overcomes the shortcomings of the prior art by providing a blower housing with a discharge that couples directly to the 4" industry standard exhaust pipe. The blower of the present invention reduces the number of parts associated with the blower, reduces assembly labor, and increases reliability by reducing the possibility of leakage. The blower of the present invention provides a blower housing which is easily manufacturable and meets the furnace designer's requirements for size and air moving capacity.

The blower of the present invention includes a housing with a top wall and opposite bottom wall with a side wall extending between the top and bottom walls. The top, bottom and side walls define a hollow interior of the blower housing and the blower housing has a discharge in communication with the hollow interior. An impeller is rotatably disposed in the blower housing and compresses the exhaust gases in the blower housing so that they may be propelled from the blower housing to the exhaust pipe. The top wall has a generally conically shaped expanding portion formed adjacent the blower housing side wall that extends from the discharge of the blower housing to the interior of the blower housing. The conically shaped expanding portion forms a tapered transition from the top wall and side wall to the discharge. The conically shaped expanding portion is configured to form a 4" discharge port that meets the industry standard to couple directly to the exhaust pipe while maintaining required performance for air moving capacity to meet the furnace manufacturer's requirements.

The blower of the present invention provides a discharge that can be seamlessly connected to the exhaust piping to reduce transition pieces and other added parts previously required in the prior art to couple the blower to the exhaust pipe. Moreover, the blower of the present invention fits directly on the furnace without the attendant problems found in blowers of the prior art.

BRIEF DESCRIPTION OF THE DRAWINGS

Further objectives and features of the present invention are set forth in the following detailed description of the preferred embodiment of the invention and in the drawing figures, wherein.

Corresponding reference characters indicate corresponding parts throughout the several views of the drawings.

DETAILED DESCRIPTION OF THE INVENTION

The use of the terms substantially and generally in the specification are meant to convey approximate shapes and orientations. The terms are not meant to limit the invention to precisely the shapes and orientations recited.

Figure 1:
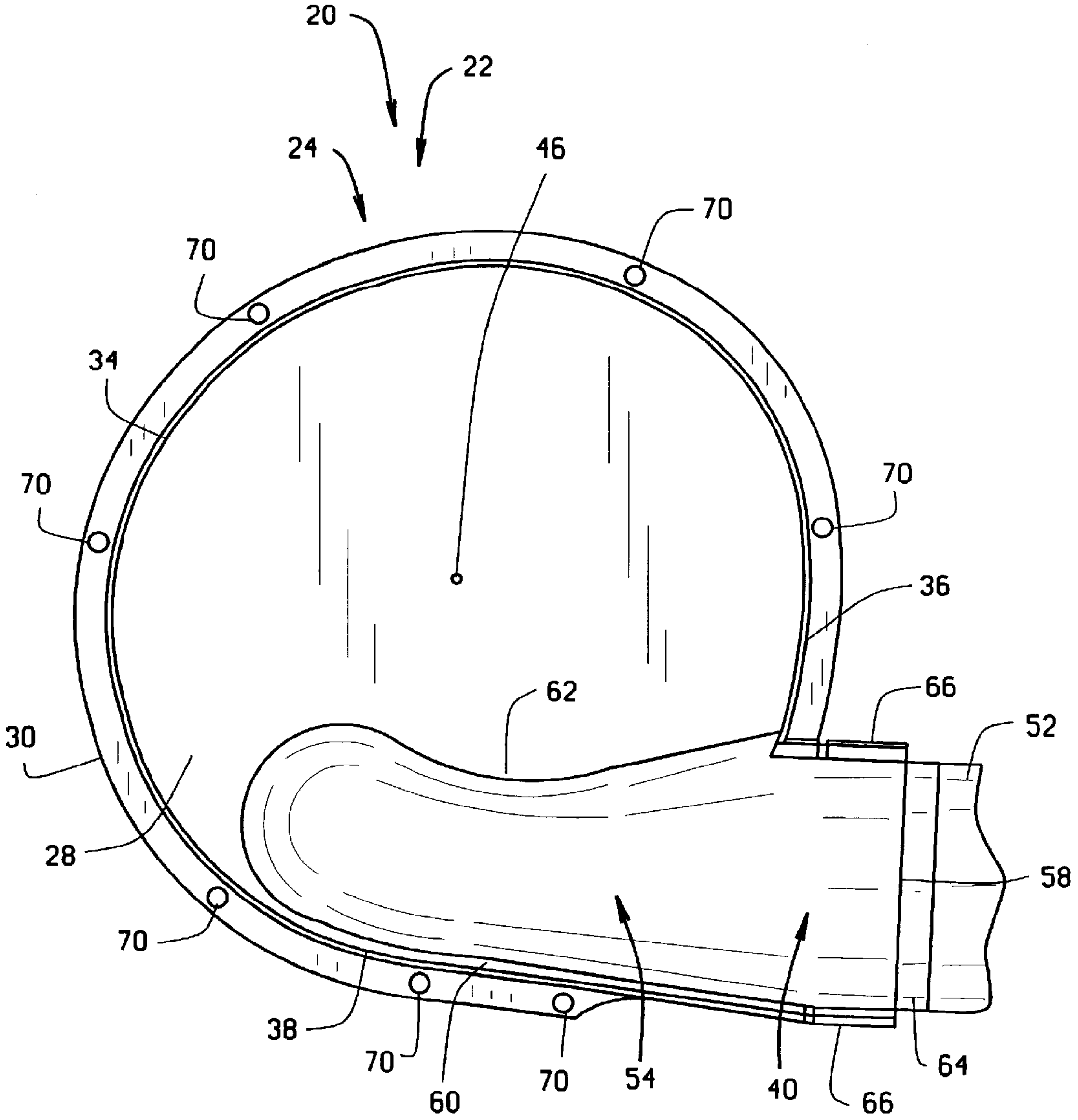
FIG. 1 is a top plan view of the blower housing of the present invention.
Figure 2:
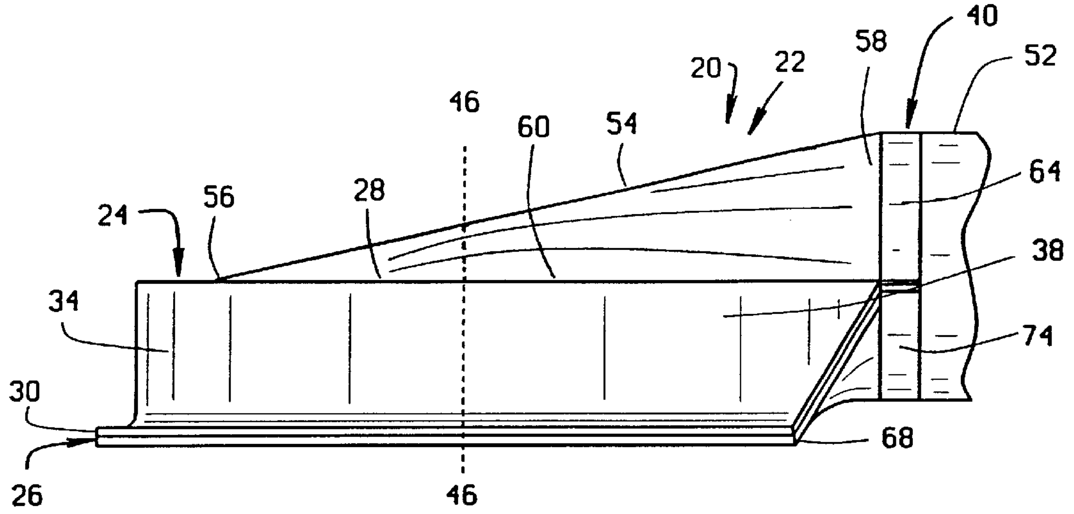
FIG. 2 is a side elevation view of the blower housing for FIG. 1.
Figure 4:
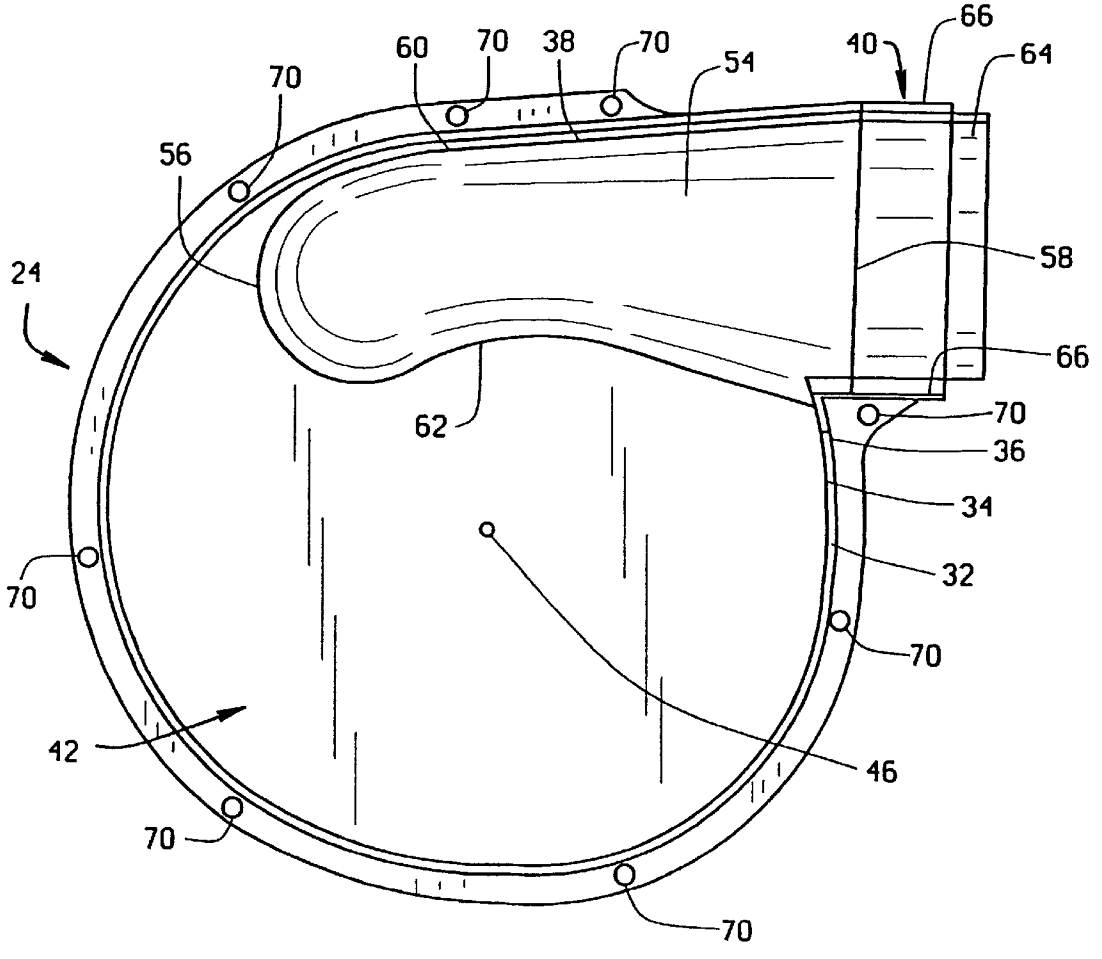
FIG. 4 is a bottom view of a top piece of the blower housing of FIG. 1.
Figure 3:
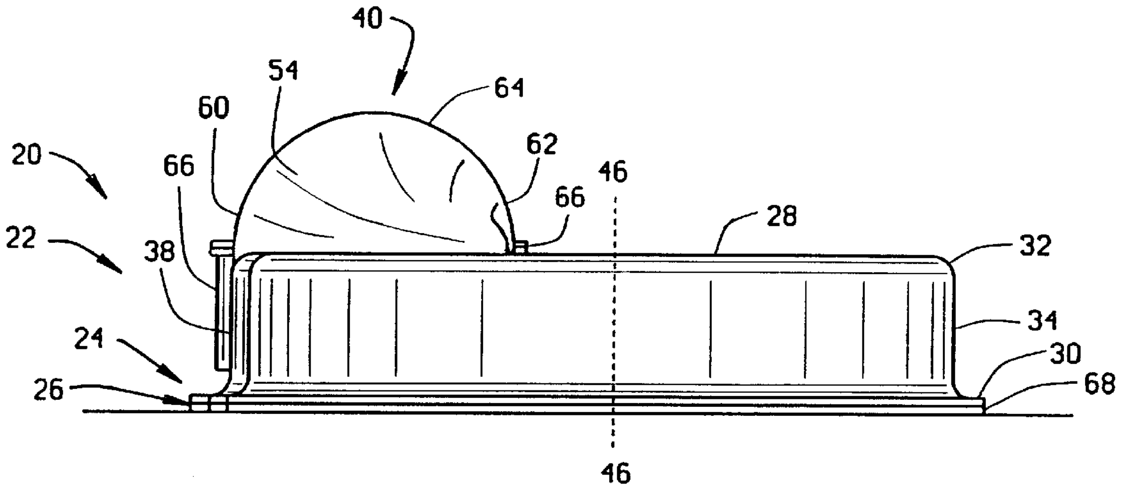
FIG. 3 is a side elevation view of the blower housing of FIG. 1.
Figure 5:
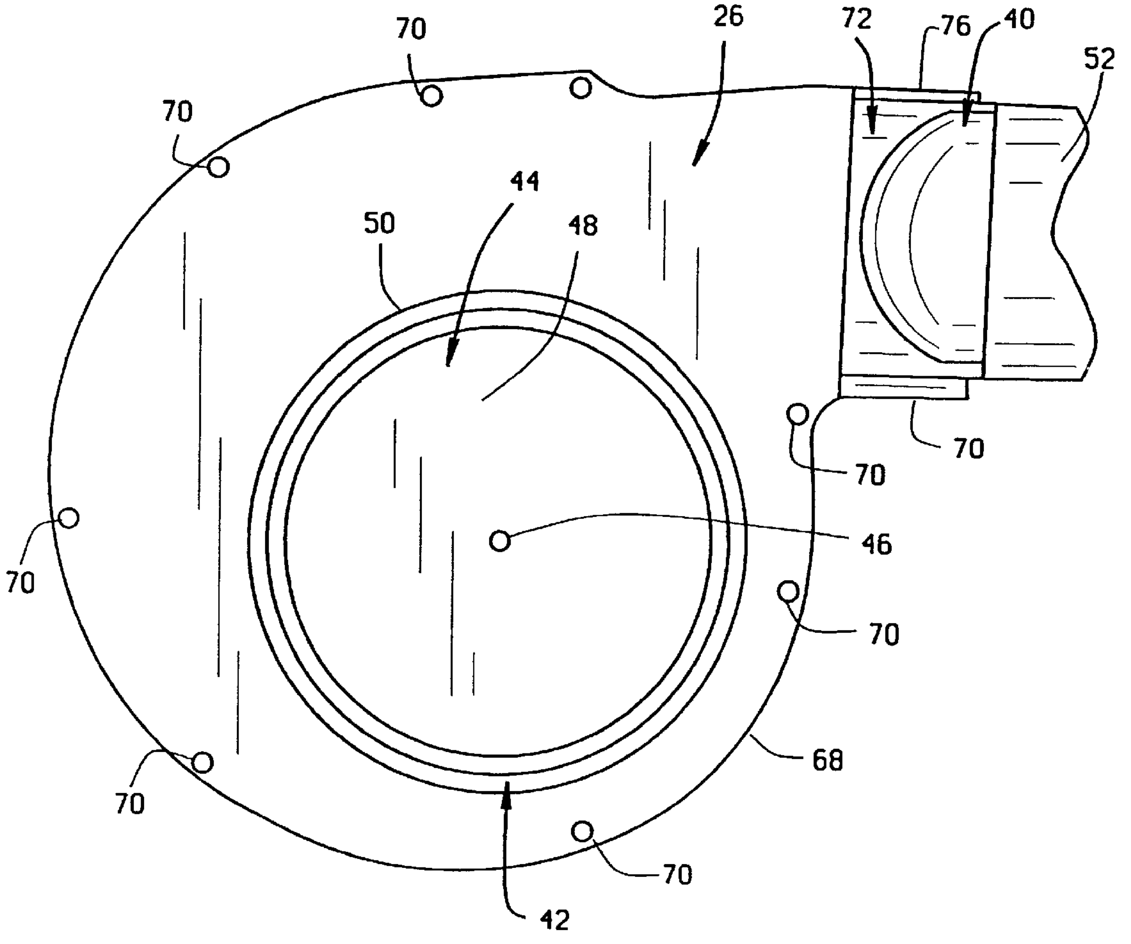
FIG. 5 is a bottom view of blower housing of FIG. 1.

FIGS. 1 to 5 show the blower of the present invention, generally indicated at reference character 20. The blower 20 includes a housing 22 formed from a top piece 24 and a bottom piece 26. The top piece 24 of the housing 22 has a generally circular top wall 28 and an opposite bottom wall flange 30. The top wall 28 has an outer peripheral edge 32 and a side wall 34 depends from the top wall peripheral edge 32 to extend between the top wall 28 and bottom wall flange 30. The side wall 34 has a volute shape expanding outwardly from an inlet portion 36 to an outlet portion 38 as it extends around the top wall peripheral edge 32. At the outlet portion 38 of the side wall 34, the side wall 34 and top wall 28 are formed into a discharge 40. Opposite the top wall 28, the bottom wall flange 30 extends around the side wall 34, outward and away from the side wall 34 to expose a blower housing hollow interior 42 defined by the top wall 28, bottom wall flange 30, and the side wall 34.

The blower housing hollow interior 42 is configured and adapted to house an impeller 44 that rotates about a center axis 46 of the blower housing 22. The blower housing center axis 46 is perpendicular to a plane defined by the top wall 28 and the bottom wall flange 30. The impeller 44 has a back plate 48 which supports impeller blades (not shown) and provides a surface for connection to a shaft of a blower motor (not shown). Rotation of the impeller 44 compresses exhaust gases in the blower housing 22 against the inlet portion 36 of the side wall 34 and ejects the gases at the outlet 38 of the side wall 34. The blower motor (not shown) is conveniently mounted on the bottom piece 26 of the blower housing 22 and the blower motor shaft is directed into the blower housing interior through a fan and shaft hole 50 in the bottom piece 26 of the housing. The housing bottom piece hole 50 is large enough to pass the fan, mounted to the motor shaft, through the bottom piece hole 50. The blower housing discharge 40 is coupled to an exhaust pipe 52 where the exhaust combustion gases are vented to the external atmosphere.

The blower housing 22 of the of present invention is preferably manufactured with the top wall 28 and side wall 34, bottom wall flange 30 and discharge 40 integrally formed. More preferably, the top and side walls 28,34, bottom wall flange 30, and discharge 40 are formed monolithically from a single metallic stock blank of galvanized sheet metal that is stamped to the required dimensions and shape. While the invention has been described as being made out of galvanized sheet metal, it should be understood that other materials may be utilized without departing from the scope of the invention as defined by the claims. In a preferred embodiment of the invention, the side wall 34 has a height of approximately 1¾" to 2¼" and the top wall 28 has a reference diameter of about 6½" inches. The impeller 44 fitted into the hollow interior of the blower housing is approximately 1⅝" to 2" high and ranges in diameter from 4⅝" to 4⅞".

The blower housing discharge 40 is formed with an outwardly expanding portion 54 that terminates with a four inch diameter connection that allows direct coupling to the exhaust pipe 52. As stated previously, the industry standard size for exhaust piping 52 in residential applications is four inch diameter round piping or ducting. The top wall 28 in the area of the discharge 40 is preferably formed in a conical shape that expands outward to increase the interior 42 of the blower housing. The outwardly expanding conical shape 54 has a first side apex 56 that is formed in the top wall 28 adjacent the conterminous top wall peripheral edge 32 and side wall 34 and a second side 58 at the outermost expansion of the discharge. The distance between the first and second ends 56,58 of the conically shaped expanding portion is between 6¾" and 7". Preferably, the conical shape expands from the first end 56 to the second end 58 in a curvilinear fashion following the general contour of the volute shape of the blower housing 22.

The conically shaped expanding portion 54 has an outer edge 60 aligned with the outlet portion 38 of the side wall 28 and an inner, arcuate edge 62 that has a similar radius of curvature to that of the impeller 44. The inner, arcuate edge 62 allows for nesting of a blower motor against the top wall 28, if required by the application. The arcuate inner edge 62 also prevents substantial loss of pressure and efficiency of the blower 20, as will be explained later. The curvilinear configuration of the conically shaped expanding portion 54 allows the top wall 28 and side wall 34 to be more easily formed from a single stamping operation with no "thinning" of material in the top wall 28 and with minimal stresses between the top wall 28 and side wall 34 in the side wall inlet area 36 adjacent the discharge 40.

The conically shaped expanding portion 54 forms the top semi-circular half of the discharge 40 where the center height of the center of the four inch discharge 40 is arranged approximately 3" upward from the top piece bottom wall flange 30. As the discharge 40 extends at a distance away from blower housing 22, it creates clearance with the furnace bonnet and other supporting structure (not shown) which facilitates installation of the blower housing 22 on the furnace and connection to the exhaust pipe 52. The conically shaped expanding portion 54 is provided with a boss connection section 64 that extends outward as a half-cylinder from the discharge 40. The boss section 64 facilitates coupling to the exhaust pipe 52.

On both sides of the discharge 40, the top piece is formed with attachment members 66 angling up from the bottom wall flange 30 and extending outward from each side of the conical shaped expanding portion 54. The attachment members 66 extend along the opposite sides of the conically shaped exhaust portion 54 to the boss section 64 leaving the boss section 64 clear to be coupled to the exhaust pipe 52.

The bottom piece 26 of the blower housing 22 is formed generally flat but with a peripheral edge 68 in the general shape of the top piece 24 and with a portion of the discharge 50. Like the top piece 24, it is preferably stamped from a single blank sheet of metal. The bottom piece 26 abuts the bottom wall flange 30 of the top piece 24 when the top and bottom pieces 24,26 of the blower housing 22 are assembled together. Both the bottom wall flange 30 and bottom piece 26 are provided with a series of matching circumferentially spaced holes 70 therearound that allow the blower housing 22 to be mounted directly to a furnace bonnet (not shown). The bottom piece 26 may be attached to the top piece. 24 by crimping the peripheral edge 68 of the bottom piece 26 around the bottom wall flange 30 of the top piece 24. The bottom piece center hole 50 leads into the interior 42 of the blower housing 22 when the top piece 24 and bottom piece 26 of the blower housing 22 are assembled together. Exhaust gases are drawn through the center hole 50 into the blower housing interior by the rotation of the impeller 44.

On the bottom piece 26, a bottom piece exhaust transition 72 extends upward at an angle and transitions from being generally flat to having a semi-circular shape extending therethrough. Similar to the top piece 24, the bottom piece exhaust transition 72 also has a boss section 74 in the shape of a half cylinder. The boss sections 64,74 of the top and bottom pieces 24,26 match to define the four inch diameter discharge 40 required for coupling to the exhaust pipe 52. On either side of the semi-circular shape on the outer edges of the bottom piece exhaust transition 72, a bottom piece attachment member 76 is provided. The top and bottom pieces 24,26 of the blower housing are formed with complementary, matching exhaust transition pieces that form the discharge 40 as described in co-pending application Ser. No. 09/651,645 filed Aug. 30, 2000, entitled "Furnace Blower Housing with Integrally Formed Exhaust Transition", now U.S. Pat. No. 6,314,894, issued Nov. 13, 2001. Preferably, the attachment members 66,76 are attached together by crimping or bending and folding the attachment members 66,76 over each other, thereby forming a secured, sealed connection between the pieces 24,26 in the discharge 40.

The outwardly expanding conical portion 54 of the blower housing 22 creates a tapered transition from the exhaust pipe 52 to the blower housing 22. As the impeller rotates in the blower housing interior volume 42, the impeller 44 sweeps across a portion of the interior of the conical shaped expanding portion 54. In order to avoid the loss of pressure and air moving capacity from this arrangement, the back plate of the impeller 48 is positioned in the interior 42 of the blower housing with a portion of its outer periphery overlapping a portion of the conically shaped expanding portion 54. The rotation of this portion of the impeller back plate 48 over the interior of the conically shaped expanding portion 54 maintains the efficiency and air moving capacity of the blower 20 and prevent substantial pressure loss in the volute and in particular in the conically shaped expanding portion 54.

While the present invention has been described by reference to specific embodiments, it should be understood that modifications and variations of the invention may be constructed without departing from the scope of the invention as defined by the following claims.

What is claimed:

1. A housing for a fan that rotates about an axis of rotation to draw air into the housing and discharge the air from the housing, the fan axis of rotation defining mutually perpendicular axial and radial directions relative to the housing, the housing comprising:

a housing section having a top wall with a peripheral edge, a side wall that extends around at least a portion of the peripheral edge, a bottom wall flange that is spaced axially from the top wall by the side wall, a tubular transition that extends outwardly from the side wall to a distal end of the transition that defines a discharge opening of the transition, the transition projecting from the housing section in a direction axially away from the bottom wall flange to the transition distal end and in a direction radially away from the side wall to the transition distal end, and an outwardly expanding portion of the housing section having a length with opposite first and second ends that extends across the top wall and progressively protrudes axially outwardly from the top wall as it extends from the first end to the second end.

2. The housing of claim 1, further comprising:

the outwardly expanding portion has a progressively increasing convexity as it extends from its first end to its second end.

3. The housing of claim 1, further comprising:

the outwardly expanding portion merges into the tubular transition at its second end.

4. The housing of claim 1, further comprising:

the top wall, side wall, bottom wall flange, transition and outwardly expanding portion are all one monolithic piece of material.

5. The housing of claim 1, further comprising:

the outwardly expanding portion has a radial width that increases along at least a portion of the outwardly expanding portion extending from the first end to the second end.

6. The housing of claim 1, further comprising:

the top wall is flat within the peripheral edge except for the outwardly expanding portion.

7. The housing of claim 1, further comprising:

the transition distal end is dimensioned to connect with a four inch diameter pipe.

8. The housing of claim 1, further comprising:

the outwardly expanding portion has an interior cross section that increases along at least a portion of the outwardly expanding portion extending from the first end to the second end.

9. The housing of claim 1, further comprising:

the bottom wall is a bottom wall flange that projects radially outward from the side wall.

10. The housing of claim 1, further comprising:

the transition has first and second separate sections that each extend outwardly from the side wall in the same direction axially away from the bottom wall and radially away from the side wall to the transition distal end.

11. A blower for a furnace comprising:

a blower housing having a center axis and a top wall and an opposite bottom wall aligned in a plane perpendicular to the center axis, the top wall and bottom wall being separated by a side wall that extends around the center axis, the top wall, bottom wall, and side wall defining a hollow interior of the blower housing, the bottom wall having an opening that leads to the hollow interior, the blower housing having a discharge in communication with the hollow interior;

an impeller rotatably disposed in the blower housing hollow interior, the impeller rotates about the blower housing center axis;

the top wall having a generally conically shaped expanding portion formed adjacent the blower housing side wall and extending from the discharge to the blower housing interior whereby the conically shaped expanding portion forms a tapered transition from the discharge to the top wall and side wall, the conically shaped expanding portion extends axially away from the top wall in a direction away from the bottom wall whereby the diameter of the conically shaped expanding portion at the discharge is approximately four inches; and the top wall, side wall, and discharge have been stamped from a single metallic stock blank.

12. A blower for a furnace wherein the blower has a blower housing with an interior and an impeller rotatably disposed in the interior about a center axis of the blower housing, rotation of the impeller draws exhaust gases from the furnace and compresses the exhaust gases in the blower housing where the exhaust gases are propelled into an exhaust pipe to be vented to atmosphere, the blower comprising:

a blower housing body having a volute side wall extending around the blower housing center axis and a top wall extending across the side wall in a plane perpendicular to the center axis, the side wall and top wall define a hollow interior of the blower housing; and a discharge extending outward from the top wall that communicates with the interior of the blower housing, the discharge having a generally circular cross-section with a diameter of approximately four inches, the discharge directly coupling to the exhaust pipe;

the discharge, side wall and top wall have been formed from a single flat piece of material; and the top wall is formed with a generally conically shaped expanding portion, the conically shaped expanding portion extends from the blower housing interior to the discharge to form a tapered transition from the discharge to the blower housing.

13. The blower of claim 12, wherein:

the side wall progressively curves outwardly toward the discharge pipe, and the conically shaped expanding portion is formed in the blower housing adjacent the side wall.

14. The blower of claim 12, wherein:

the impeller has a back plate positioned adjacent the conically shaped expanding portion.

15. The blower of claim 12, wherein:

the blower housing side wall has a height between 1⅞ inches to 2¼ inches.

16. A blower for a furnace comprising:

a blower housing having a center axis and a top wall and an opposite bottom wall aligned in a plane perpendicular to the center axis, the top wall and bottom wall being separated by a side wall that extends around the center axis, the top wall, bottom wall, and side wall defining a hollow interior of the blower housing, the bottom wall having an opening that leads to the hollow interior, the blower housing having a discharge in communication with the hollow interior;

an impeller rotatably disposed in the blower housing hollow interior, the impeller rotates about the blower housing center axis;

the top wall having a generally conically shaped expanding portion formed adjacent the blower housing side wall and extending from the discharge to the blower housing interior whereby the conically shaped expanding portion forms a tapered transition from the discharge to the top wall and side wall, the conically shaped expanding portion extends axially away from the top wall in a direction away from the bottom wall whereby the diameter of the conically shaped expanding portion at the discharge is approximately four inches;

the side wall has a bottom peripheral edge that extends around the blower housing, the bottom peripheral edge abuts the bottom wall to seal the interior of the blower housing; and the bottom wall forms a portion of the discharge.

17. The blower of claim 16, wherein:

the axial height of the side wall is between 1⅞ inches and 2¼ inches.

18. The blower of claim 16, wherein:

the portion of the bottom wall forming the discharge has an arcuate cross-section whereby the discharge is generally circular with a diameter of approximately four inches.

19. The blower of claim 16, wherein:

the top wall, side wall, and bottom peripheral edge are monolithically formed from a single piece of material.

20. The blower housing of claim 16, wherein:

the conically shaped expanding section has a curvilinear edge that follows a general contour of the side wall and an inner arcuate edge.

21. The blower housing of claim 16, wherein:

the length of the conically shaped expanding portion is between 6¾ inches and 7 inches.

* * * * *